INVENTOR.
Fritz-Otto Zeyen
BY
[signature]
att'y

INVENTOR.
Fritz-Otto Zeyen
BY
[signature]
att'y.

1

3,026,039

ELECTRONIC APPARATUS FOR OBTAINING FOR REPRODUCTION PURPOSES CORRECTED COLOR EXTRACTIONS FROM UNCORRECTED COLOR EXTRACTIONS

Fritz-Otto Zeyen, Heikendorf, near Kiel, Germany, assignor to Dr.-Ing. Rudolf Hell Kommanditgesellschaft, Kiel-Dietrichsdorf, Germany, a German corporation Filed Oct. 31, 1958, Ser. No. 771,101
Claims priority, application Germany Nov. 4, 1957
1 Claim. (Cl. 235—180)

Figure 1:
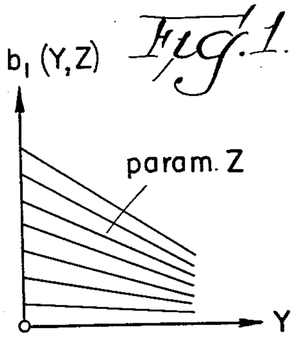

This invention relates to color reproduction techniques in the printing art and is particularly concerned with electronic apparatus for automatically recalculating a set of uncorrected color extractions (blue, red, yellow) represented by the totality of components of color measuring values of color picture points of the color copy to be reproduced, into a set of three corrected color extractions (blue, red, yellow) represented by the totality of the components of color dosing of the picture points of the reproduction to be printed.

This recalculation or conversion is referred to in the reproduction art as color correction which is required because, on the one hand, color measuring values are always obtained in the production of uncorrected color extractions—be it by the use of photographic processes or by the use of electro-optical scanning by means of photocells, etc.—which are determined by the light sources and the filter means employed and by the spectral sensitivity of the recording member, and on the other hand, because the content of the corrected color extractions must not consist of color measuring values but of color or pigment dosings which depend largely upon the color reproduction materials as well as upon the paper used for printing and upon the printing process employed.

Reasons for more extensive conversion reside in the necessity, frequently arising in practical operation, to reproduce favorably even copies in which the color range of the coloring matter does not correspond to that of the color materials used for reproduction, or in which the color range is more or less distorted (color-glaring or hard copies), making it desirable to change the color values of the reproduction in determined manner as compared with those of the copy.

All these reasons make it practically always necessary to convert the initially obtained so-called uncorrected color extractions into so-called corrected color extractions.

In the following explanations, the term "uncorrected color extractions" is intended to mean the totality of components of color measuring values, each belonging to a picture point of the initial copy to be reproduced. These extractions are obtained by optical evaluation of a copy by means of a light-recording member having a predetermined spectral sensitivity distribution (for example, a photographic plate, photocell, etc.) and by the use of three color filters of predetermined spectral permeability and an illumination with a light source of predetermined spectral energy distribution. The evaluation may be effected simultaneously for an entire copy (for example, a photograph) or for a multitude of successive individual light points of a copy (for example, picture scanning with moving light point and photocell). The uncorrected color extractions may be present in various forms, for example, in the form of photographic plates ("uncorrected color extractions" in narrow sense of the reproduction technique), which had been obtained from an original by exposure through predetermined color filters, and in which the corresponding components of photographic darkening or transparence belong to each picture point; or in the form of three photocell currents which are produced with synchronous, simultaneous line-for-line scanning of such photographic extractions by means of a moving light point or dot and a photocell.

2

The expression "corrected color extractions" is in the following explanations intended to mean the totality of components of coloring material dosings, belonging to a picture point of the reproduction which corresponds to an equivalent picture point of the copy to be reproduced. The dosings of coloring matter may likewise be present in various forms, for example, as "relative screen point sizes" in the case of relief printing, or as "relative depths of cutouts," in the case of intaglio printing, or as darkening or transparence of three photographic plates ("corrected color extractions" in narrow sense of the reproduction technique), by means of which the printing forms or plates for the various printing types including relief printing, intaglio printing and offset printing may be produced; and, finally, they may be present as components of electrical voltages for controlling three variable light sources as to brightness, for pointwise and line-for-line illumination of photographic plates as corrected extractions, as is known from the picture telegraph technique.

The customary procedures in correcting the original (uncorrected) color extractions involve manual retouching of the color extraction negatives or partial corrective etching of the printing forms produced by means of the uncorrected color extractions but not yet finally etched for printing purposes.

Photomechanical masking processes are also being used. In such processes, positives of different densities are for each color produced by copying from the uncorrected color extraction negatives, and such positives are brought in different combinations into register with the original negatives for the other two colors. These pairs of plates are again copied, so that positives with altered density are obtained from the original negatives. For relief printing, these positives are again copied, resulting finally in more or less well corrected color extraction negatives. At any rate, the art in the photomechanical production of masks does not rely solely upon judgment and the eye, but applies methods of measuring techniques involving coincident photographing of gray wedges and color sample tables of predetermined gradation so as to permit more effective judging of the density range of the masks to be selected. However, the masking methods are not accurate; they require almost invariably manual retouching of the corrected color extraction plates.

The manual and photomechanical correction methods are cumbersome, time consuming, and call for trained operators (for retouching and etching) who must command great experience and artistic talents. Colored reproductions are increasingly being used in newspapers and magazines and the costly and time consuming manual and photomechanical correction methods can, therefore, not be successfully continued.

Numerous suggestions have been made for the automation of the color correction, attempting to comprehend analytically the relation between corrected and uncorrected color extractions based upon theories concerning the color correction process.

The procedure basically assumes that the colored copy is photoelectrically scanned or that three previously produced uncorrected photographic color extractions of the original copy are photoelectrically scanned, that the color measuring values of the original, thus obtained and represented by electrical signals are recalculated in an electronic computer to produce color dosings likewise represented by electrical signals, and that the calculated color dosings are recorded punctiform in the manner of corrected photographic color extractions, or that the three printing forms are in accordance with the calculated color dosings electromechanically directly engraved.

At this point may be mentioned masking equations suggested by various authors, based upon scanning of three uncorrected photographic color extractions produced from the color original, with photographic recording of the calculated masking densities. In accordance with these suggestions, the masks are brought into register with the uncorrected color extraction negatives and are copied. For relief printing, the positive are again copied and the resulting negatives constitute the corrected color extractions. The masking equations have not been successful in practice and are not sufficiently accurate when applied to proving copies.

H. E. J. Neugebauer (Dissertation "Concerning the Theory of Multi-Color Printing," Dresden 1935) has given equations that permitted for the first time exact comprehension of the color correction process for relief printing. Three third degree algebraic equations are thereby involved, giving the known color measuring values of the color original as whole rational third degree functions of the unknown color dosings. The elimination of the three unknown quantities results for each of the three unknown in an algebraic equation of the ninth degree which as is known cannot be generally solved algebraically. The solution of the Neugebauer equations can accordingly be effected only by approximation methods, for example, by stepwise bracketing, proceeding from arbitarily selected solution values and successively improving thereon by directed bracketing until the equations are satisfied with sufficient accuracy.

Bonzanigo (Dissertation, Zürich 1939) has disclosed an essentially mechanical calculating machine for solving the Neugebauer equations which, however, operates much too slow, being unable to keep step with the speed at which color measuring values are supplied in accordance with the scanning speed of a copy or of photographic color extractions demanded in modern operation.

Hardy and Wurzburg (United States Patent No. 2,434,561, dated January 12, 1948, entitled "Color Facsimile") have developed an electronic device for solving the Neugebauer equations. Since the equations are not present in the form of explicit solutions to the unknown, there are required feedbacks for effecting the solution by bracketing in individual successively applied steps. This is carried out electronically at great speed, so that the solutions for an unknown totality of components are found within less than a milliescond, constituting a calculating speed which corresponds to the scanning speed.

However, even the Neugebauer equations do not satisfy practical requirements since they do not consider the tone value distortions caused respectively by the reproduction of unscreened copies by screened printing and by the etching in the production of printing forms. The Neugebauer equations are in the last analysis valued only for relief printing and for offset printing. In the case of intaglio printing, the color effect does not depend, as in relief printing, only upon the spatial distribution of the eight pure and mixed colors, but very much upon the layer thickness of the individual pure printing colors, such thickness generally being for each color variable from picture point to picture point, as contrasted with relief printing and flat printing involving constant color layer thickness.

All efforts expanded until now in attempts to seize mathematically accurately the association between uncorrected and corrected color extractions in the case of intaglio printing, have failed, and the approximation formulae proposed therefor are for practical use much too inaccurate. The reason resides in the fact that, in the case of intaglio printing, the color effect of the superimposed prints of the reproduction printing colors depends upon very many factors which are difficult to comprehend in their entirety.

Attempts at discovering analytically, that is, to express by mathematical formulae, the associations between the color measuring values of the original and the dosings of the printing colors for the various printing methods, based upon some theories concerning color mixing, have been abandoned in recent times. It is considered sufficient to ascertain the associations empirically by numerous measurements with color sample plates, thereby providing certainty that the empirically ascertained relations are for a given printing process necessarily accurate when based upon standardized requirements for the printing colors and the printing paper to be used.

In accordance with a recent proposal of H. E. J. Neugebauer (Germant patent application A 22409 of March 31, 1955), the trichromatic coordinates of a great number of sample plates are measured and are, together with the values of the color amounts used in the production of the sample plates, registered in the storage device of an automatic calculating machine, and the values of the color amounts required for making the reproductions depending upon the trichromatic coordinates of the color pictures, are taken from the storage device.

Regardless of whether the association between the corrected and uncorrected color extractions is ascertained theoretically or empirically, the color dosings B, R, G will in each case constitute certain characteristic, unique and continuous functions $b$, $r$, $g$ of the three color measuring values X, Y, Z:

$$B=b(X,Y,Z) \text{ (Blue)}$$
$$R=r(X,Y,Z) \text{ (Red)}$$
$$G=g(X,Y,Z) \text{ (Yellow)}$$

wherein the three functions $b$, $r$, $g$ depend upon the reproduction printing colors, the printing paper and the printing process.

The electrical representation of these three functions respectively of three variables, in a color scanner, requires electrical recalculation of the color measuring values X, Y, Z to the color dosings B, R, G, whereby the values of functions and the values of variables are represented by electrical signals proportional thereto.

While it is known and possible to represent electrically three variables, the devices known for doing it are very complicated (for example, electro-optical storage devices made of lens screen films), and it is, therefore, desirable to provide simpler devices to take their place. Upon transition from two to three variables, there appear in the electrical representation of functions basic difficulties which can be overcome only by unusual expenditure.

The invention avoids these difficulties by the provision of a method which comprises reducing the three functions each with three variables $$B=b(X, Y, Z) \text{ (Blue)}$$
$$R=r(X, Y, Z) \text{ (Red)}$$
$$G=g(X, Y, Z) \text{ (Yellow)}$$

which represent the relationship or association between the color measuring values X, Y, Z and the color dosings B, R, G, to nine functions each with two variables, based upon the symmetrical structural properties $$B=b_3(U; Z) \text{ (Blue)}$$
$$R=r_3(V; X) \text{ (Red)}$$
$$G=g_3(W; Y) \text{ (Yellow)}$$

wherein $b_3$, $r_3$, $g_3$ are three other functions each of two of the six variables U, V, W; X, Y, Z and U, V, W being three functions of the three variables X, Y, Z of the form $$U=[X-b_1(Y, Z)]\cdot b_2(Y, Z)$$
$$V=[Y-r_1(Z, X)]\cdot r_2(Z, X)$$
$$W=[Z-g_1(X, Y)]\cdot g_2(X, Y)$$

$b_1, r_1, g_1; b_2, r_2, g_2$ being six further functions each of two of the three variables X, Y, Z, and executing the required calculating and functional operations in an electronic analog calculator, to the inputs of which are continuously conducted electrical voltages or currents which are proportional to the color measuring values X, Y, Z, and from the outputs of which are derived continuously and without any delay electrical voltages or currents which are proportional to the color dosing values B, R, G.

The symmetrical structural properties referred to, that is, the expressions for the three intermediate variables U, V, W have been ascertained in the course of extensive investigations and measurements, using a great number of color sample plates that had been produced with all possible superimposed printing combinations of three reproduction colors in all possible densities. These structural properties remain preserved when using other reproduction printing colors, other kinds of printing paper and another printing process.

Upon substituting in the equations for R, B, G the intermediate variables U, V, W in accordance with their values as given above, the three functions $b, r, z$ will assume the form $$B=b_3\{[X-b_1(Y, Z)]\cdot b_2(Y, Z); Z\} \text{ (Blue)}$$
$$R=r_3\{[Y-r_1(Z, X)]\cdot r_2(Z, X); X\} \text{ (Red)}$$
$$G=g_3\{[Z-g_1(X, Y)]\cdot g_2(X, Y); Y\} \text{ (Yellow)}$$

$b_3, r_3, g_3$ constituting in this representation other functions.

A consideration of these three equations will show that they are uniformly constructed, each consisting of three mutually telescoped functions.

The first expression within the angular bracket represents a zero point suppression of the first quantity therein. The second expression between the angular bracket and the semicolon represents an amplification of the zero point suppressed quantity with variable amplification factor. The total function in addition to the results of the product formed by both expressions finally depends also explicitly upon one of the variables X, Y, Z. The functions $b_1, r_1, g_1$ and $b_2, r_2, g_2$ depend respectively only upon two of the three variables X, Y, Z. The intermediate variables U, V, W depend explicitly each upon one of the intermediate variables X, Y, Z and upon two of the six functions $b_1, r_1, g_1$, and $b_2, r_2, g_2$. Implicitly, they depend upon all three variables X, Y, Z. The color dosings B, R, G, that is, the functions $b_3, r_3, g_3$, due to the introduction of the intermediate variables U, V, W, depend explicitly respectively only upon two variables, namely, upon one of the intermediate variables U, V, W and one of the color measuring values X, Y, Z.

A reduction of the three original functions $b, r, g$, respectively of three variables to more or fewer than nine functions in each case of two variables would be possible. However, a reduction to fewer than nine functions would be too inaccurate for practical use, and a reduction to more than nine functions would entail undue expenditures for the present purposes. The importance of the structural properties thus resides in the reduction to neither more nor less than nine functions of each of two variables.

An electronic computer device for carrying out the necessary calculating and functional operations will therefore comprise three principal parts, namely (1) a circuit for suppressing the zero point of an input value in the predetermined functional dependence upon the other two input values; (2) a circuit for amplifying the zero point suppressed input value in the predetermined functional dependence upon the other two input values; and (3) a circuit for repeated distortion of the zero point suppressed and amplified input value in the predetermined functional dependence upon one of the other two input values.

At the output of this circuit there will be obtained a value which corresponds to the corrected, therefore, to the correct dosing of the corresponding reproduction color.

In accordance with another object, the invention is carried out by switching means and cooperation of parts comprising (*a*) three similarly constructed electronic computing channels each with three inputs and one output, to the inputs of which are conducted color measuring values X, Y, Z of the color picture point of the original picture or copy to be reproduced, represented by proportional electrical signals, and from the outputs of which are derived the color dosings B, R, G of the picture point of the reproduction to be printed, represented by proportional electrical signals; (*b*) each computing channel comprising a main channel and two control channels; (*c*) each main channel comprising a series circuit of a subtraction switching means, a multiplication switching means and a function switching means, each having a main input, a control input, and an output which is connected with the main input of the next successive switching means; (*d*) means for deriving a signal from the output of the function switching means in the main channel which is proportional to the color dosing (B, R, G) calculated in the channel; (*e*) means for conducting to the input of the subtraction switching means in the chain channel the signal which is proportional to the color measuring value (X, Y, Z) and which corresponds so far as the color is concerned (X:B; Y:R; Z:G) to the color dosing obtained at the output of the main channel; (*f*) means for conducting to the control input of the function switching means in the main channel the signal which is proportional to that color measuring value (X, Y, Z) which in the cyclical arrangement of the color measuring values X, Y, Z immediately precedes in this sequence and direction ahead of the color measuring value the proportional signal voltage of which is being conducted to the main input of the main channel; (*g*) the two control channels comprising respectively the parallel circuit of two function switching means on the input side, each with two inputs and one output, the two mutually corresponding inputs belonging to the same variables being connected in parallel, and one of those of the two signals being conducted to the two input pairs which are proportional to the two remaining color measuring values which are not conducted to the main channel; and (*h*) means for connecting the output of the first control channel with the control input of the subtraction switching means; and means for connecting the output of the second control channel with the control input of the multiplication switching means in the main channel.

Figure 8:
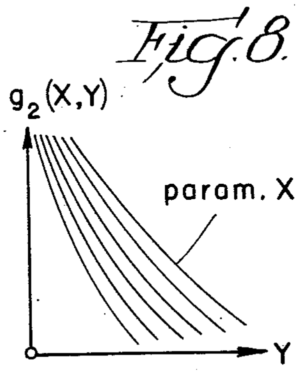
Figure 9:
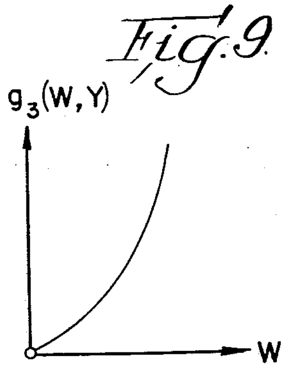
Figure 10:
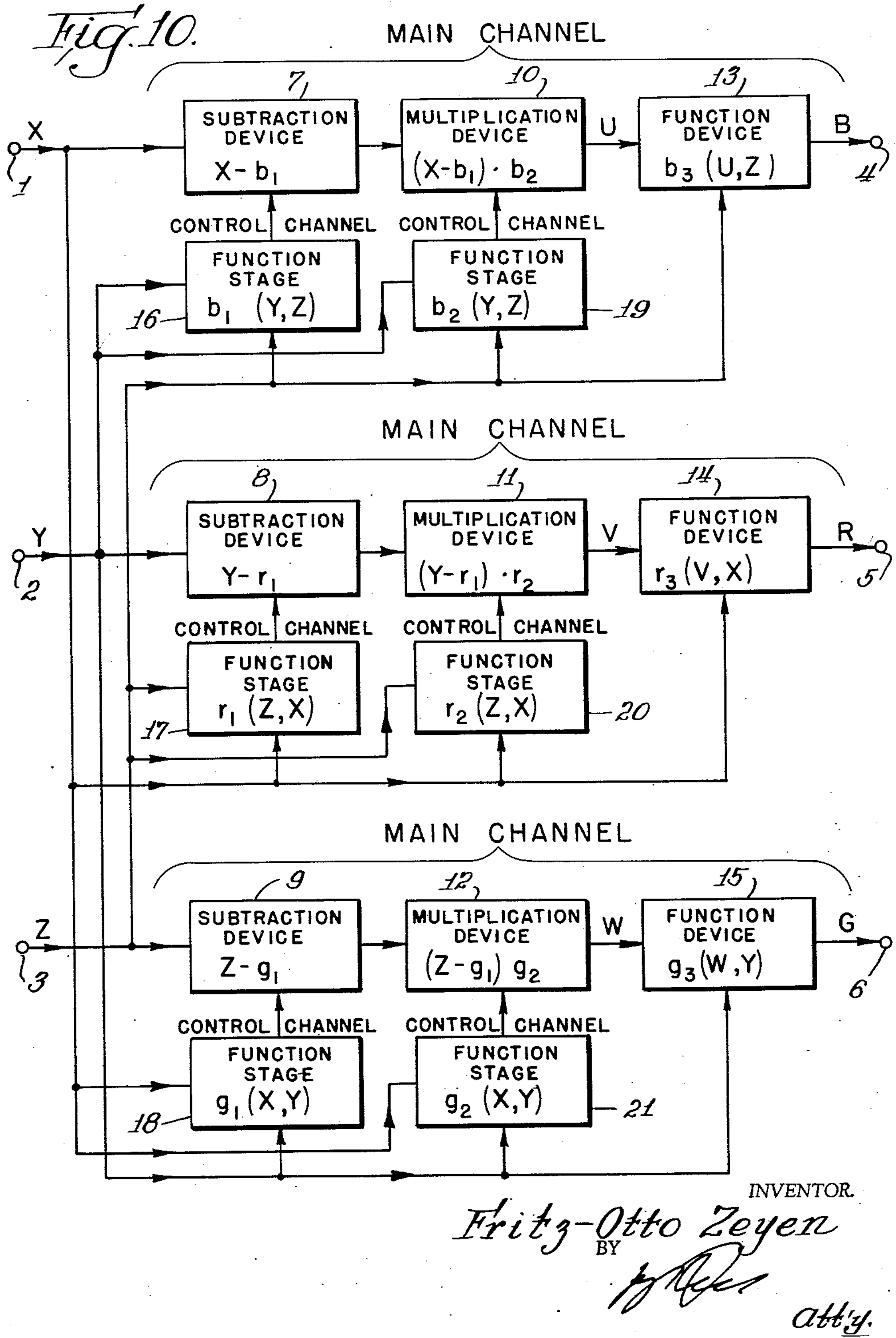

The various objects and features of the invention will now be explained with reference to the accompanying drawings in which FIGS. 1–9 show examples of the functions $b_i, r_i, g_i, i=1, 2, 3$; and FIG. 10 represents in block diagram manner a basic circuit for the electronic computer.

Figure 2:
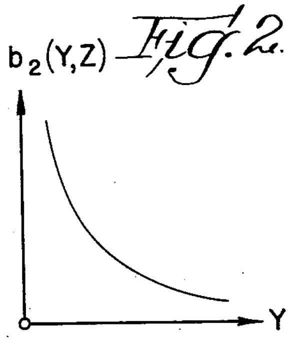
Figure 3:
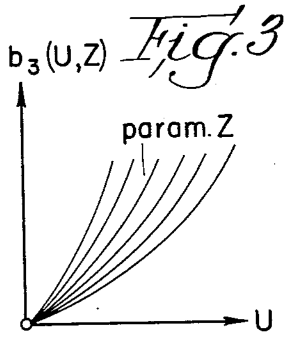
Figure 4:
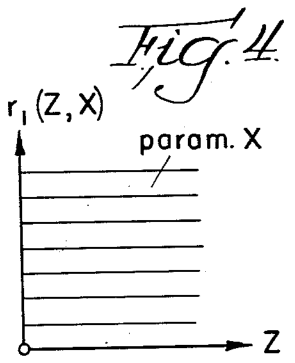
Figure 5:
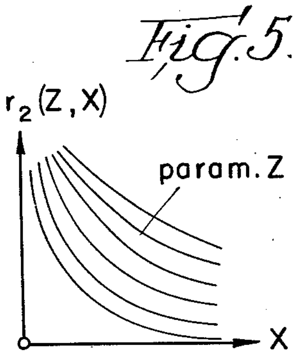
Figure 6:
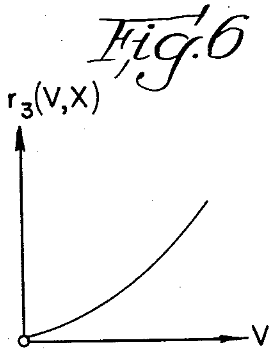
Figure 7:
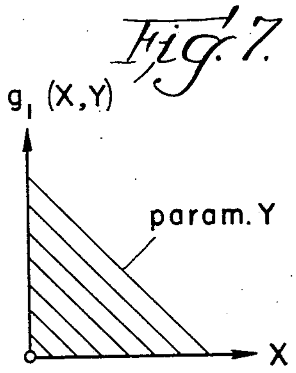

FIGS. 1–9 show nine examples for the course of the functions $b_i, r_i, g_i, i=1, 2, 3$. Since these functions depend upon two variables, they are represented in the form of curve flights which results when one variable is selected as an independent variable and the other as a group parameter. The examples show qualitatively the approximate course of these functions assuming predetermined reproduction printing colors, a predetermined paper type and a predetermined intaglio printing process. Upon altering the reproduction printing colors, the printing paper and the printing process, the functions will not change their characteristic course. The function examples $b_i, r_i, g_i, i=1, 2, 3$ shown respectively in FIGS. 1, 4 and 7; FIGS. 2, 5, 8; and 3, 6, 9, are of identical character, independent of the color components to be corrected.

The functions $b_i, r_i, g_i$, FIGS. 1, 4, 7, show straight line flights, whereby there were selected in FIG. 1, Y as an independent variable and Z as parameter; in FIG. 4, Z as independent variable and X as parameter; and in FIG. 7, X as independent variable and Y as parameter. In FIG. 1, the falling straight flight curves have a meeting point (not shown) upon the Y-axis; in FIG. 4, the straight flight curve extend parallel to the Z-axis; in FIG. 7, the straight flight curves are parallel falling straight lines.

In case of the functions $b_2$, $r_2$, $g_2$, Y is assumed in FIG. 2 as the independent variable; in FIG. 5, X is assumed as the independent variable and Z as parameter; and in FIG. 8, Y is assumed as the independent variable and X as parameter. The function $b_2$ is in the example independent of Z and its course is, accordingly, represented by a single curve. The curves extend monotonously falling with negative, increasing differential quotient.

In the case of the functions $b_3$, $r_3$, $g_3$, FIG. 3, U is the independent variable and Z the parameter; in FIG. 6, V is the independent variable; and in FIG. 9, W is the independent variable. The function $r_3$ in FIG. 6 is in the assumed example independent of X and the function $g_3$, FIG. 9, is independent of Y and these two functions are therefore represented each by a single curve. The curves of these three functions extend monotonously rising with positive increasing differential quotient.

FIG. 10 shows a basic block diagram circuit of the electronic analog computer for carrying out the calculating and functional operations. In this computer, the input values, that is, the color measurement values, are represented by proportional voltages, and the output values, that is, the color dosings, are represented by voltages proportional to the input voltages. These voltages may be direct or alternating voltages.

In order to avoid introducing new designations, the electrical input voltages are again indicated by X, Y, Z and the electrical output voltages by B, R, G. The three input voltages X, Y, Z may come from a photoelectric scanning of three uncorrected photographic color extractions or from a photoelectric scanning of the color original effected through three suitable color filters.

The three electrical output voltages B, R, G may be the control voltages of three recording lamps by means of which the three corrected photographic color extractions are recorded, or they may deliver the control voltages for the drive systems of three engraving tools, by means of which the three color extraction printing form for the reproduction of the originals is directly engraved.

The circuit comprises three similarly constructed computer channels 7, 10, 13, 16, 19; 8, 11, 14, 17, 20; and 9, 12, 15, 18, 21, each having three inputs and one output, to the inputs 1, 2, 3 are conducted the color measurement voltages X, Y, Z of the color picture points of the copy to be reproduced, and from the outputs 4, 5, 6 are derived the color dosing voltages B, R, G for the color picture point of the reproduction to be printed.

Each computer channel comprises a main channel and two control channels. The respective main channels comprise a series circuit of subtraction devices 7, 8, 9; multiplication devices 10, 11, 12; and function devices 13, 14, 15, each having a main input, a control input, and an output.

The three pairs of control channels 16, 19; 17, 20 and 18, 21 each affect a main channel, namely, the control channels 16, 19 affect the main channel 7, 10, 13; the control channels 17, 20 affect the main channel 8, 11, 14; and the control channels 18, 21 affect the main channel 9, 12, 15. Each pair of control channels comprises two function stages each having one output and two respectively parallel connected inputs. The two mutually corresponding inputs of the function stages of one pair, which belong to the same variable, are connected in parallel, and one of the two color measuring voltages which is not extended to the main channel, is respectively connected thereto.

The output of the first control channel 16, 17, 18 of each pair is respectively connected with the subtraction devices 7, 8, 9; the output of the second control channel 19, 20, 21 of each pair is respectively connected with the control input of the multiplication devices 10, 11, 12.

To the control inputs of the function devices 13, 14, 15 respectively disposed in the three main channels, are conducted the color measuring voltage values Z, X, Y.

The subtraction devices 7, 8, 9 comprise in their simplest form means for oppositely connecting the two voltages, one of which is to be subtracted from the other, while observing phase similarity.

The multiplication devices 10, 11, 12 are linear regulation amplifiers to the main and regulation inputs are respectively extended the two factors of the products to be formed. The amplification of one factor is thereby controlled depending upon the other factor.

There are a great number of possibilities for producing in the function devices 13–15 and function stages 16–21 the functions $b_i$, $r_i$, $g_i$, $i=1, 2, 3$, each with two variables.

Electron-optical storage devices are known for this purpose, wherein the function values $z$ of a function $z=f(x, y)$ of two variables $x$ and $y$ are in the form of blackenings registered upon a rectangular film or a glass plate at places with rectangular coordinates $x$, $y$. The taking off of the function values $z$, responsive to extending to this device the pairs of variables $x$, $y$, is effected as follows:

Upon one side of the storage plate is disposed a cathode beam tube with the screen thereof facing the plate. The electron beam is deflected by horizontal and vertical deflection voltages which are proportional to the two variables $x$, $y$. The deflected light spot upon the screen of the tube is pictured by optical means at the place $x$, $y$ of the storage plate. The light of the light spot upon passing through the plate is more or less weakened according to the blackening encountered, such blackening corresponding to the respectively associated function value $z$. Upon the other side of the plate is disposed optical means which pictures the light beam passing through the plate on the cathode of a photocell in which the variable light intensity, corresponding to different blackenings on the storage plate, is converted into a fluctuating photoelectric current the intensity of which is proportional to the associated function value $z$.

Instead of employing photographic registration of the function values upon a storage plate, in the form of blackening, there may be utilized registration in an electron-optical storage device, in the form of charge densities, with electronic scanning of the charges in similar manner as in a picture chopping tube.

When the representation of a monotone function with monotonously extending differential quotients is involved, purely electronic devices may be advantageously applied, utilizing the slope of characteristic curves of electron tubes. A desired monotonously rising course with positive, monotonously rising or falling differential quotient may within certain limits be imparted to these characteristic curves by the degree of control or overcontrol up to saturation range and by cutting the lower or upper part thereof. Further monotonously rising curve forms may be obtained by addition of such characteristic curves.

Such an electronic device may in its simplest form consist of an amplifier tube to the grid of which is conducted the alternating voltage of constant amplitude which is to be amplified, and from the plate circuit of which is derived the distorted alternating voltage with the desired amplitude function.

Suitably distorted amplitudes or additive amplitudes may be directly employed for producing monotonously rising functions with positive, monotonously rising or falling differential quotients, such as have been assumed in FIGS. 3, 6, 9 for the functions $b_3$, $r_3$, $g_3$.

The course of curves according to FIGS. 2, 5, 8 with monotonously falling functions $b_2$, $r_2$, $g_2$ and a negative increasing differential quotient, may be obtained by subtracting the curve flights according to FIGS. 3, 6, 9 from a straight flight parallel to the axis of the independent coordinate. This may be done electrically by subtracting with observance of phase identity, alternating voltages with an amplitude course according to FIGS. 3, 6, 9 from an alternating voltage with constant amplitude and identical frequency.

Further devices for the electrical or electronic representation of functions of two variables are known, wherein the electron beam of a cathode beam tube is horizontally deflected by an independent voltage and vertically according to a function template provided upon the screen, the vertical deflection voltage which is automatically controlled by the template slot or contour supplying the voltage corresponding to the desired function.

There are finally circuits known in which a desired curve form is approximated by a polygon pattern. Such patterns are produced by a voltage divider comprising two resistors, to which is conducted the independent voltage, one of the resistors being voltage-dependent by parallel connection of a plurality of electrical valves provided with control resistors and differently biased thereby, whereby, the individual valves become successively conductive when the part of the independent voltage which lies at the valves exceeds the bias of the individual valves, the dependent voltage being taken off at one of the two voltage divider resistors.

In the event that correction of multi-color extractions is desired, for example, a four-color extraction including a black extraction, or a six-color extraction, as used in connection with offset printing, there is first produced a three-color extraction with is corrected in accordance with the invention. This corrected three-color extraction is thereupon without further correction recalculated respectively into a corrected four or six-color extraction which, however does not form part of the invention.

Changes may be made within the scope and spirit of the appended claim which defines what is believed to be new and desired to have protected by Letters Patent.

I claim:

Electronic apparatus for use in the reproduction printing art, for automatically recalculating a set of three uncorrected blue, red and yellow color extractions represented by the totality of the trios of color measurement values of picture points of the color copy which is to be reproduced, into a set of three corrected blue, red and yellow color extractions represented by the totality of the trios of color dosings of the picture points of the reproduction which are to be printed superposed, having three similarly constructed electronic computer channels each provided with three inputs and one output, to the inputs of which are respectively conducted the color measurement values X, Y, Z of the color picture points of the copy to be reproduced, represented by proportional electric signals, and at the outputs of which are obtained, represented by proportional electric signals, the color dosings B, R, G of the color picture points of the reproduction to be printed, wherein each computer channel consists of a main channel and two control channels, each main channel comprising, disposed in series relationship, a subtraction device, a multiplication device and a function switching device, each said device having means forming respectively a main input and a control input and an output therefor, the output of each respective device being connected with the main input of the respectively serially successively related device, at the output of the respective function device being obtained the signal which is proportional to the color dosing calculated in the corresponding channel, means for conducting to the main input of the respective subtraction device the signal which is proportional to the color measuring value which corresponds with respect to the color to the color dosing obtained at the main channel, means for conducting to the control input of the respective function device the signal which is proportional to the color measuring value which with cyclic arrangement of the color measuring values X, Y, Z directly precedes the color measuring-value the proportional signal voltage of which is conducted to the main input of the main channel, said control channels each comprising a function stage provided with two inputs and one output, means for disposing corresponding inputs of the function stages of a respective main channel in parallel extending pairs whereby the inputs of each pair are related to the same variable, means for conducting to each pair one of the two signals which are respectively proportional to the remaining color measurement values which are not conducted to the corresponding main channel, and means for connecting the outputs of said control channels respectively with the control input of said subtraction device and said multiplication device disposed in the corresponding main channel.

References Cited in the file of this patent

"Electronic Computer for Color Printing" (Rose), Communication and Electronics, No. 18, May 1955, pp. 268–272 relied on.